United States Patent [19]
Hiwatashi

[11] Patent Number: 6,009,377
[45] Date of Patent: Dec. 28, 1999

[54] LANE MOVING-OUT PREVENTION SYSTEM FOR VEHICLE AND THE METHOD THEREOF

[75] Inventor: Yutaka Hiwatashi, Gunma, Japan

[73] Assignee: Fuji Jukogyo Kabushiki Kaisha, Tokyo, Japan

[21] Appl. No.: 08/995,065

[22] Filed: Dec. 19, 1997

[30] Foreign Application Priority Data

Jan. 9, 1997 [JP] Japan .................................. 9-002301

[51] Int. Cl.⁶ ...................................................... G01S 7/78
[52] U.S. Cl. .............................. 701/301; 701/9; 701/23; 701/41; 340/436; 340/438; 340/937; 150/204
[58] Field of Search ................................. 701/9, 23, 41, 701/53, 301; 340/937, 425.5, 436, 438; 180/204, 6.2, 6.24; 382/199

[56] References Cited

U.S. PATENT DOCUMENTS

| | | | |
|---|---|---|---|
| 5,307,419 | 4/1994 | Tsujino et al. | ............................. 701/28 |
| 5,511,630 | 4/1996 | Kohata et al. | ........................... 150/422 |
| 5,528,888 | 6/1996 | Miyamoto et al. | ....................... 701/50 |
| 5,555,312 | 9/1996 | Shima et al. | ............................ 382/104 |

FOREIGN PATENT DOCUMENTS 6255514  9/1994  Japan .

*Primary Examiner*—William A. Cuchlinski, Jr.
*Assistant Examiner*—Gertrude Arthur
*Attorney, Agent, or Firm*—Martin A. Farber

[57] ABSTRACT

When a vehicle is moving out of a lane of a road, an image processing computer unit judges the hazardous condition. Then, a power steering control computer unit calculates a correction reaction force based on the steering angular velocity and increases a steering reaction force so as to generate a large steering effort. This lane moving-out prevention system is constituted such that only when the steering angular velocity is large, i.e., when a driver turns a steering wheel sharply, the steering reaction force is increased, thereby no additional reaction force is produced when the driver makes a normal turn.

20 Claims, 5 Drawing Sheets

LANE MOVING-OUT PREVENTION SYSTEM FOR VEHICLE AND THE METHOD THEREOF

BACKGROUND OF THE INVENTION

1. Field of the invention

The present invention relates to a lane moving-out prevention system and method in which a vehicle is prevented from moving out of a lane by controlling assist force of a power steering mechanism.

2. Prior Arts

There is an idea of realizing safety of a vehicle by positively assisting a driver's operation and a system introducing this idea is so-called Active Drive Assist (ADA) System. A primary function of the ADA system is to estimate a hazard of a collision with a forward vehicle, a hazard of a contact with an object, a possibility of a moving-out from a lane of a road and the like, based on surrounding information or running conditions of a vehicle and to inform a driver of these hazardous possibilities or to activate various control devices.

Many traffic accidents in highways are caused by drivers' inadvertent behaviors such as moving-out from a lane due to sudden drowsiness falling upon drivers. Various technologies have been developed in order to prevent the moving-out from a lane.

One of such ADA systems is exemplified by Japanese Patent Application Laid-open No. Toku-Kai-Hei 6-255514. In this ADA system, a function generator called "stable running potential energy" is established such that the stable running potential energy becomes high as the vehicle comes closer to the lane marker and it becomes low as the vehicle goes farther from the lane marker. When the stable running potential energy becomes high, an assist force of a power steering is reduced and when the stable running potential energy becomes low, the assist force is increased.

However, according to the ADA system, since the steering operation is controlled after the vehicle actually comes close to the lane marker, the responsiveness of the steering operation is insufficient. In particular, when the steering wheel is turned sharply, the system does not work properly.

SUMMARY OF THE INVENTION

In view of the above disadvantages, it is an object of the present invention to provide a lane moving-out prevention system and method having good responsiveness and a low cost.

DESCRIPTION OF THE DRAWINGS

By way of example only, a specific embodiment of the present invention will now be described, with reference to the accompanying drawings, in which.

DETAILED DESCRIPTION OF THE INVENTION

Figure 1:
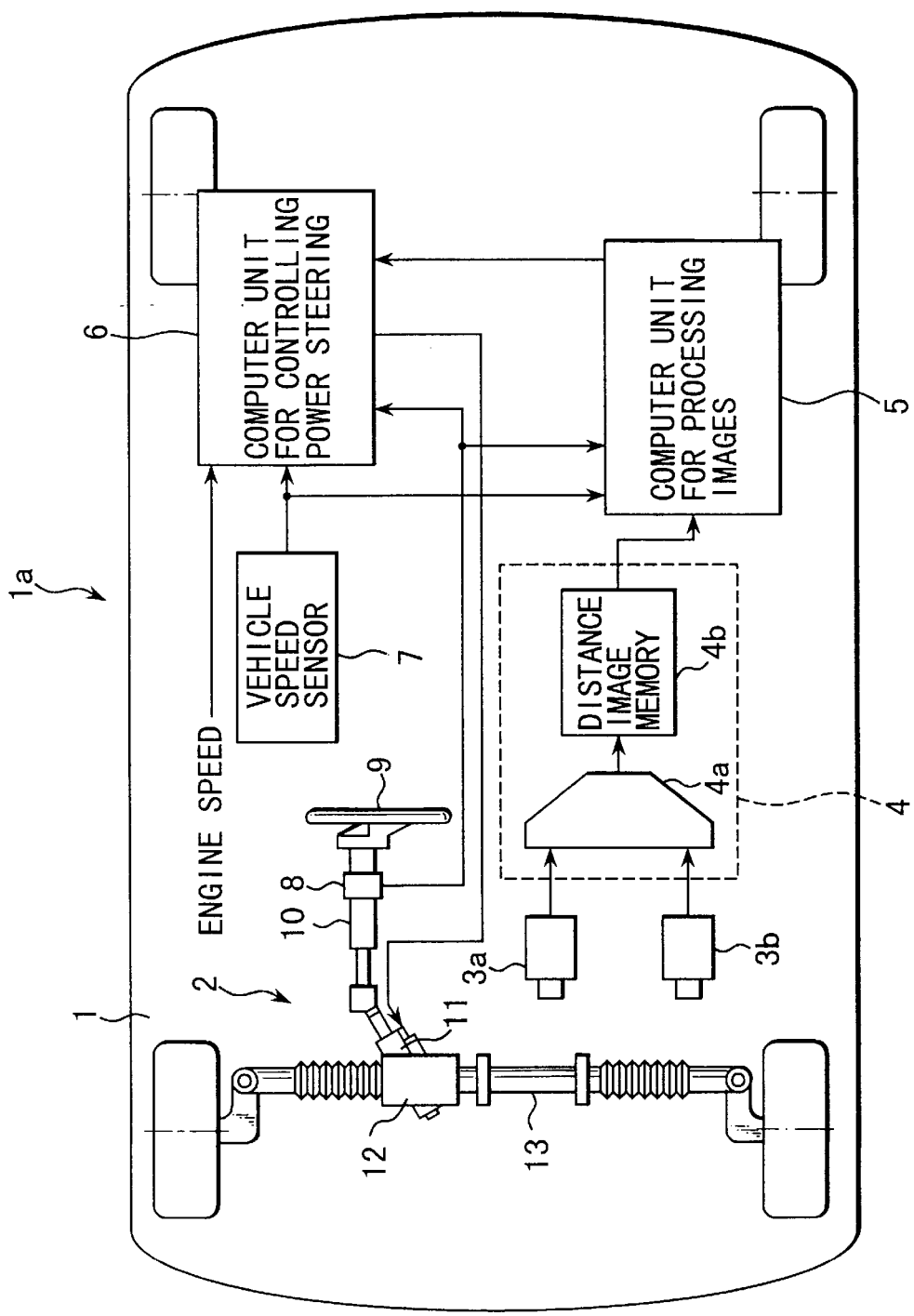
FIG. 1 is a schematic diagram showing a lane moving-out prevention system according to the present invention.

Referring now to FIG. 1, numeral 1 denotes a vehicle and numeral 1a denotes a lane moving-out prevention system installed on the vehicle 1. The lane moving-out prevention system 1a is a system for preventing the vehicle 1 from moving out of a lane by increasing a steering reaction force of a power steering mechanism 2 when the vehicle comes close to the lane marker.

Further, the lane moving-out prevention system 1a has a pair of CCD cameras 3a, 3b disposed one for each on the left and right sides of the vehicle 1. The CCD cameras are for recognizing the lane which the vehicle 1 traces.

The CCD cameras 3a, 3b are connected with an image processor 4 in which three-dimensional distance distributions are calculated over an entire image according to the principle of triangulation. The image processor 4 is constituted by a distance detecting circuit 4a for searching a portion imaging an identical object from two stereoscopic images, for calculating a distance to the object and for outputting distance distributions data in the form of the image picture and a distance image memory 4b for memorizing the distance distributions data.

The image processor 4 is connected with a computer unit 5 for processing the distance distributions data and for recognizing the configuration of a road or a plurality of solid objects. Further, the computer unit 5 is connected with a computer unit 6 for controlling the power steering mechanism 2.

Further, the computer unit 5 for processing images (hereinafter, referred to as image processing computer unit) receives signals from a vehicle speed sensor 7 and a steering angle sensor 8, respectively and the computer unit 6 for controlling power steering (hereinafter, referred to as power steering control computer unit) receives signals from the vehicle speed sensor 7 and the steering angle sensor 8, respectively. Further, in addition to these signals, the power steering control computer unit 6 receives a signal of engine speed calculated in an engine control computer unit (not shown).

On the other hand, the power steering mechanism 2 is a known power steering which is constituted such that a steering input of a steering wheel 9 is transmitted to a gear box 12 through a steering shaft of a steering column 10 and a control valve 11 and hydraulic pressure of a power cylinder 13 generates a steering assist force. The hydraulic pressure fed to the power cylinder 13 is controlled by the control valve 11. The control valve 11 according to the present invention includes a reaction force mechanism therein for generating a steering reaction force, i.e., a force to resist the movement of the steering wheel 9.

Further, the control valve 11 is a direct operated solenoid valve in which an oil supply to the reaction force mechanism is controlled by a spool valve connected to an electromagnetic plunger of a linear solenoid. The steering reaction force is controlled by adjusting solenoid drive current passing through the linear solenoid. The solenoid drive current is controlled by the computer unit 6 as will be described hereinafter.

With regard to the road detecting process in the image processing computer unit 5, only a lane marker on a road is extracted using three-dimensional information formed by distance images stored in the distance image memory 4b and the configurations of a road and a lane on which the vehicle runs are recognized by correcting and changing built-in road model parameters so as to agree with an actual road configuration. The configuration of the lane is recognized as left and right lane markers. Further, when these lane markers are recognized, the position of the vehicle with respect to the lane markers, that is, the distance between the left and right lane markers and the distance between the vehicle and either of the left and right lane markers are calculated, respectively.

Further, with respect to the object detecting process by the image processing computer unit 5, only data of objects concerned are selected from each of small areas divided by lattices and distances to the objects are calculated. If the distance to two adjacent objects is identical or smaller than a specified value, these two objects are deemed to belong to the same object and if it is larger than a specified value, these two objects are regarded as different objects. After that, an outline of an object is formed from these objects.

The formation of distance image by the image processor 4 and the processes of detecting the configuration of a road and objects by the image processing computer unit 5 are described in detail in Japanese Patent Applications, Toku-Kai-Hei 5-265547 and Toku-Kai-Hei 6-177236 both of which have been invented by the inventor of the present invention.

In the power steering control computer unit 6, in addition to a known technique of controlling the steering reaction force based on vehicle speed and engine speed, the lane moving-out prevention system 1a according to the present invention has a function that when there is a possibility of moving out of a lane, the steering reaction force is controlled also by steering angular velocity. That is to say, in the power steering control computer unit 6, when it is judged that there is a possibility that the vehicle moves out of the lane recognized by the image processing computer unit 5, a correction value for correcting the steering reaction force is established based on the angular velocity of steering angle which is obtained by differentiating the steering angle detected in the steering angle sensor 8 and the steering reaction force is increased by correcting a normal steering reaction force with that correction value so as to restrict a steering operation directing the vehicle towards outside of the lane. The judgment of a possibility of a lane moving-out may be performed by the image processing computer unit 5.

The process for preventing a lane moving-out by use of the lane moving-out prevention system 1a will be described with reference to FIGS. 2 and 3.

Figure 2:
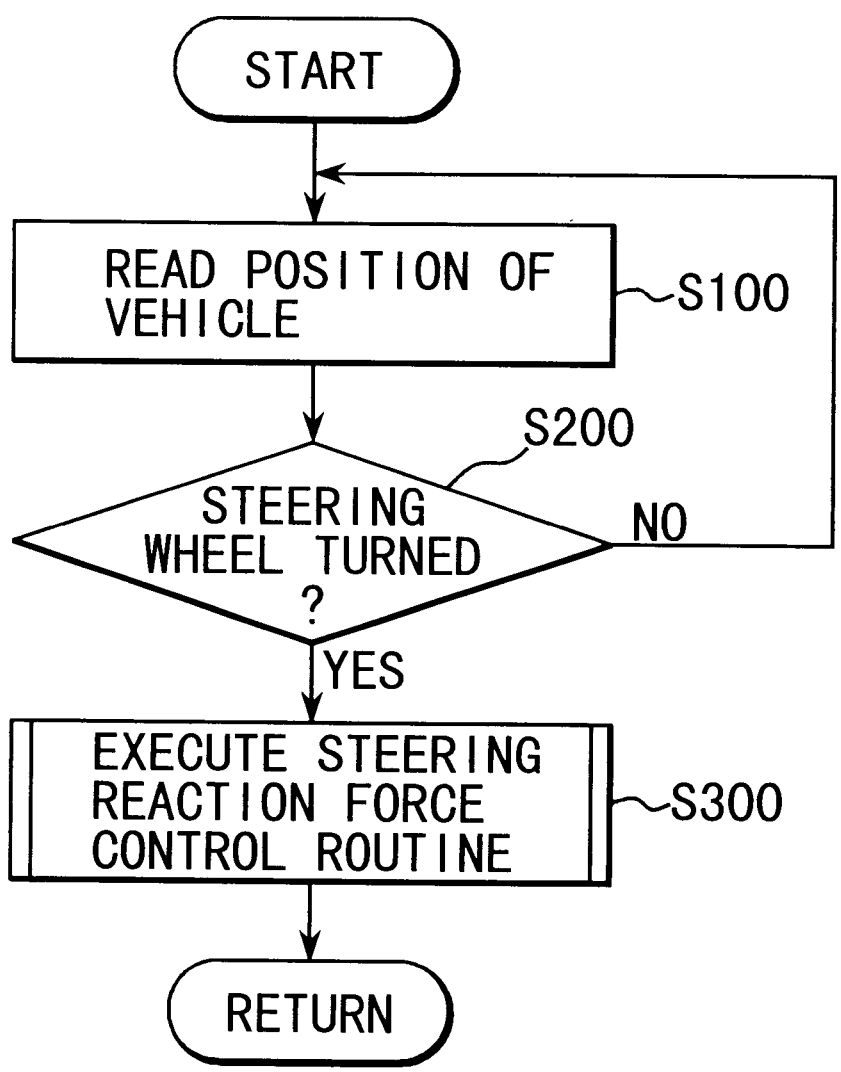
FIG. 2 is a flowchart showing a primary flow of control of a lane moving-out prevention system according to the present invention.

FIG. 2 shows a main routine executed in the power steering control computer unit 6. In which, first at a step S100 (hereinafter referred to as S number) data are read from the image processing computer unit 5 to confirm the position of the lane marker forming the lane followed by the vehicle and the position of the vehicle with respect to the lane marker and then at S200 it is judged whether or not the steering wheel is turned.

Figure 3:
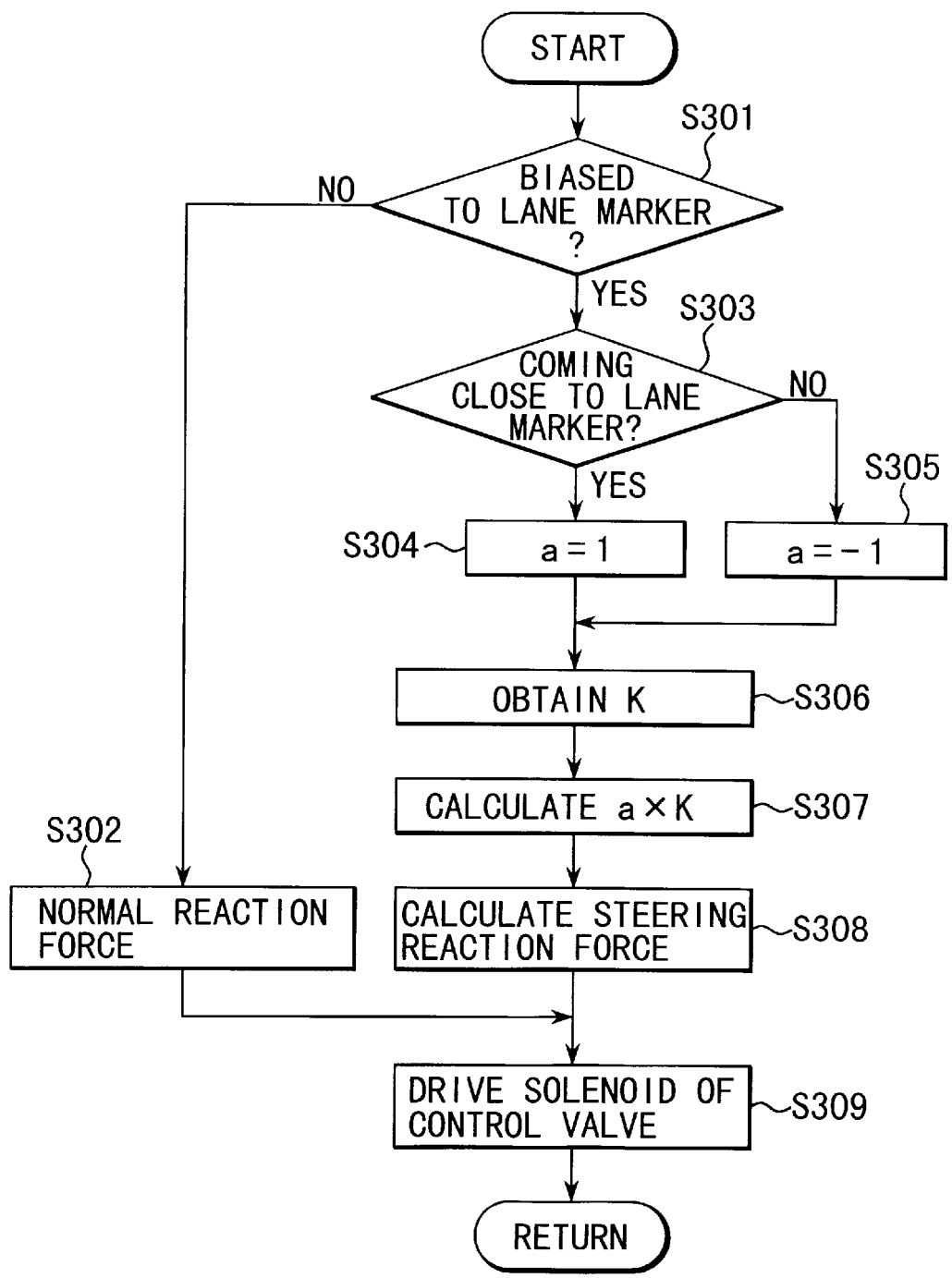
FIG. 3 is a flowchart of a steering reaction force control routine.

If it is judged that the steering wheel is not turned, the program returns to S100 and if it is judged that the steering wheel is turned, the program goes from S200 to S300 where a steering reaction force control routine shown in FIG. 3 is carried out and then the program leaves the routine.

In the steering reaction force control routine, at S301 it is judged whether or not the vehicle travels in a risky condition, i.e., a condition that the vehicle is coming close to the left or right lane marker. For example, when the position of the vehicle is within a predetermined range with respect to a reference position which is calculated from the distance between the left and right lane markers, it is judged that the vehicle is not in the risky condition and the program is diverted to S302 where the reaction force is established to be a normal value which is dependent only upon vehicle speed and engine speed. Normally, the above reference position is established so as to be a center of the distance between the left and right lane markers. After that, the program goes to S309 wherein the solenoid drive current of the control valve 11 is so controlled as to generate a normal reaction force and then the program leaves the routine.

On the other hand, when the position of the vehicle is out of the predetermined range and is biased to either of the left or right lane markers, it is judged at S301 that the vehicle is in the risky condition and the program goes to S303 where it is checked whether the steering direction is departing from or is returning to the reference position.

In this embodiment, whether the steering direction is departing from or is returning to the reference position is checked by investigating how the steering wheel has been turned with respect to an object lane marker which is closer to the vehicle, i.e., investigating whether the steering wheel has been turned in the direction of the object lane marker or in the opposite direction of the object lane marker.

When the steering wheel is operated in the direction of the object lane marker, the program goes from S303 to S304 where a correction coefficient "a" is set to be 1 and when the steering wheel is operated in the opposite direction of the object lane marker, i.e., in the direction of departing from the object lane marker, the program steps to S305 where the correction coefficient "a" is set to be −1.

After the correction coefficient is set at S304 or at S305, the program goes to S306 where a gain "K" is obtained by referring to a map parameterizing a steering angular velocity which is obtained by differentiating the steering angle detected in the steering angle sensor and then at S307 a correction reaction force is obtained by multiplying the gain "K" by the correction coefficient "a". The differential of the steering angle is provided by passing a signal of the steering angle sensor through a CR circuit like a high-pass filter of first order or by performing a digital filtering process (obtaining differences of steering angle per each sampling time Δt).

After the correction reaction force is obtained at S307, the program goes to S308 where a steering reaction force is obtained by adding the correction reaction force to the normal reaction force. Then, at S309 the solenoid drive current of the control valve 11 is controlled so as to generate this steering reaction force and the program leaves the routine.

Figure 4A:
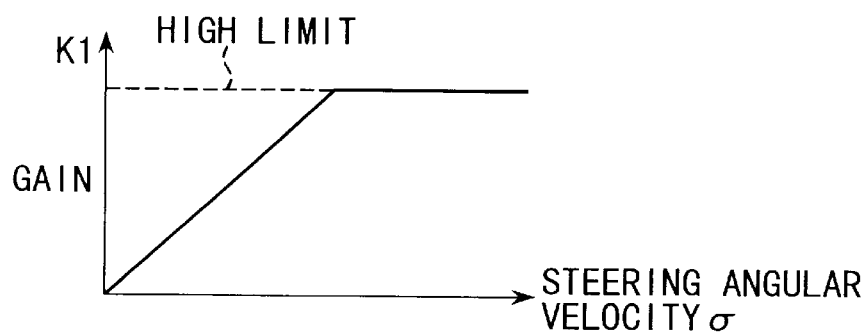
FIG. 4a is a first example of a map in which a gain is established with respect to a steering angular velocity.

The gain "K" of the correction reaction force is obtained from referring to a map parameterizing the steering angular velocity σ. Examples of the map is shown in FIG. 4a through FIG. 4d. FIG. 4a is an example wherein a gain K1 increases linearly from zero to a high limit in proportional to the steering angular velocity σ. When the vehicle is in a risky condition that the vehicle is coming close to the lane marker, the correction coefficient "a" is set to be 1 and the steering reaction force increases due to a positive correction reaction force added so as to call a driver's attention. When the vehicle is going away from the object lane marker, the correction coefficient "a" is set to be −1 and the steering reaction force decreases due to a negative correction reaction force added so as to facilitate to return the vehicle towards the reference position with a small steering force.

Figure 4B:
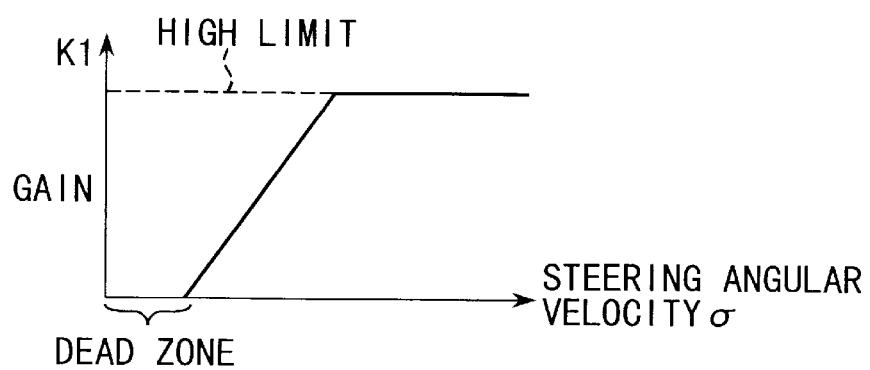
FIG. 4b is a second example of a map in which a gain is established with respect to a steering angular velocity.
Figure 4C:
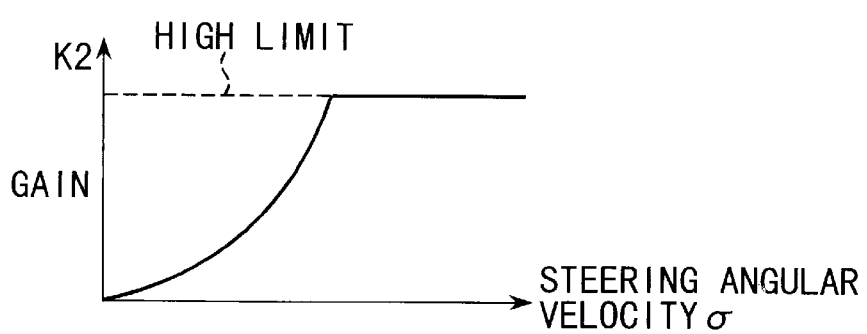
FIG. 4c is a third example of a map in which a gain is established with respect to a steering angular velocity.

Further, the gain K of the correction reaction force may be varied nonlinearly like K2 in an example of FIG. 4c.

Figure 4D:
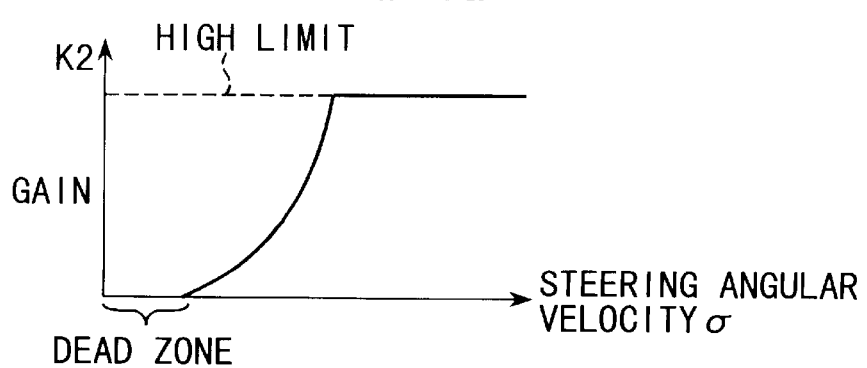
FIG. 4d is a fourth example of a map in which a gain is established with respect to a steering angular velocity.

Further, as shown in FIG. 4b and FIG. 4d, a dead zone in which no gain is generated with respect to the steering angular velocity may be provided so as to produce no additional steering reaction force when the vehicle is making a normal turn.

Further, the gain K may be established as a second gain according to the speed of the vehicle going away from the reference position (in this embodiment, replaced with an access speed to the object lane marker) or a speed of the vehicle coming close to the reference position (in this embodiment, replaced with a leaving speed from the object lane marker). The speed of the vehicle going away or coming close is calculated by differentiating the distance between the vehicle and the object lane marker.

Further, as a third gain the gain K may be established in accordance with a distance from the reference position to the vehicle (in this embodiment, replaced with a distance between the object lane marker and the vehicle).

Figure 5:
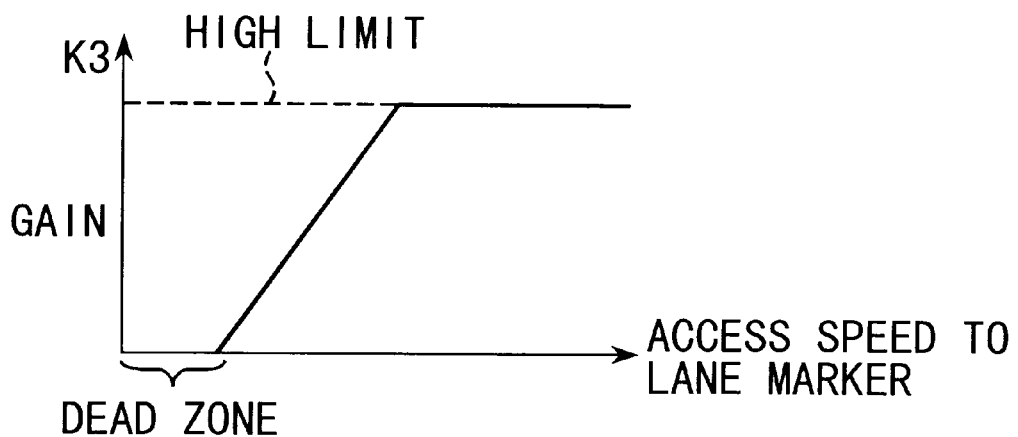
FIG. 5 is an example of a map in which a gain is established with respect to an access speed to a lane marker.

For example, as shown in FIG. 5, the second gain K3 is established so as to increase linearly with an increase of access speed to the object lane marker. In this case, although no specific drawing is shown, the second gain K3 may be established so as to vary nonlinearly with respect to the access speed to the object lane marker. According to the thus established gain, when the access speed to the object lane marker is small, the gain is established to be small and when the access speed is large, the gain is established to be large.

Figure 6:
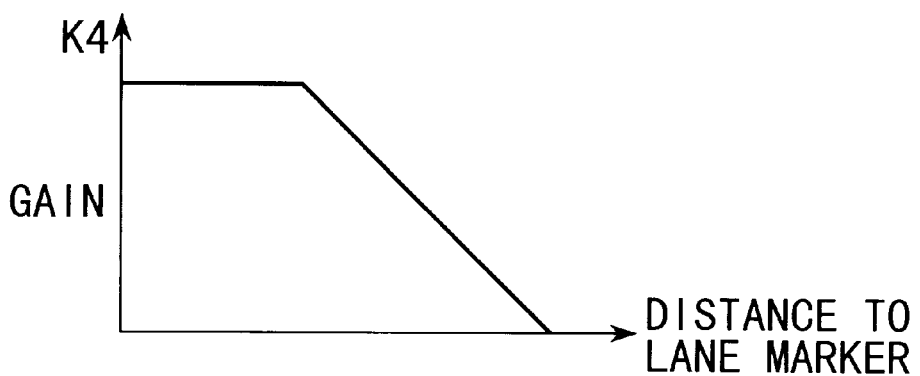
FIG. 6 is an example of a map in which a gain is established with respect to a distance to a lane marker.

Further, as shown in FIG. 6, the third gain K4 is established such that it becomes high as the distance between the object lane marker and the vehicle is smaller and it becomes low as the distance is larger.

Thus obtained second and third gains can be used in the combination with the aforementioned gains K1 and K2. That is to say, the correction reaction force is calculated as follows: a×K1 (a×K2), a×K1×K3 (a×K2×K3) and, a×K1×K3×K4 (a×K2×K3×K4).

In summary, according to the present invention, since the steering reaction force is controlled based on the steering angular velocity a, such a risky condition that the vehicle is moving out of the lane by a sharp steering operation can be prevented by applying an additional reaction force to the power steering mechanism. On the other hand, when the vehicle turns at a normal speed of the steering operation, since no additional reaction force is applied, a driver's steering effort is retained to be light.

While the presently preferred embodiment of the present invention has been shown and described, it is to be understood that this disclosure is for the purpose of illustration and that various changes and modifications may be made without departing from the scope of the invention as set forth in the appended claim.

What is claimed is:

1. A lane moving-out prevention system of a vehicle having a power steering mechanism including a steering wheel and a power assist apparatus for preventing said vehicle from moving out of a lane of a road, comprising:

stereoscopic cameras for taking an image of objects outside said vehicle and for outputting an image signal of said objects;

monitoring means responsive to said image signal for recognizing a lane traced by said vehicle;

reference position establishing means for establishing a reference position of said lane;

steering speed detecting means for detecting a steering speed;

distance detecting means for detecting a distance from said vehicle to said reference position;

departing speed detecting means for detecting a speed of said vehicle departing from said reference position;

returning speed detecting means for detecting a speed of said vehicle returning to said reference position; and control means for controlling a steering reaction force of said power steering mechanism based on said steering speed of said steering wheel when said vehicle is away from said reference position by more than a specified value.

2. The lane moving-out prevention system according to claim 1, wherein
said steering reaction force is increased according to said steering speed when said steering wheel is turned in the direction of departing from said reference position.

3. The lane moving-out prevention system according to claim 1, wherein
said steering reaction force is reduced according to said steering speed when said steering wheel is turned in the direction of returning to said reference position.

4. The lane moving-out prevention system according to claim 1, wherein
said steering reaction force is increased according to said steering speed and said departing speed when said steering wheel is turned in the direction of departing from said reference position.

5. The lane moving-out prevention system according to claim 1, wherein
said steering reaction force is reduced according to said steering speed and said returning speed when said steering wheel is turned in the direction of returning to said reference position.

6. The lane moving-out prevention system according to claim 1, wherein
said steering reaction force is increased according to said steering speed and said distance when said steering wheel is turned in the direction of departing from said reference position.

7. The lane moving-out prevention system according to claim 1, wherein
said steering reaction force is reduced according to said steering speed and said distance when said steering wheel is turned in the direction of returning to said reference position.

8. The lane moving-out prevention system according to claim 1, wherein
said steering reaction force is increased according to said steering speed, said distance and said departing speed when said steering wheel is turned in the direction of departing from said reference position.

9. The lane moving-out prevention system according to claim 1, wherein
said steering reaction force is reduced according to said steering speed, said distance and said returning speed when said steering wheel is turned in the direction of returning to said reference position.

10. A lane moving-out prevention method of a vehicle having a power steering mechanism including a steering wheel and a power assist apparatus for preventing said vehicle from moving out of a lane of a road, comprising the steps of:

generating an image signal of objects outside of said vehicle by stereoscopic cameras;

recognizing a lane traced by said vehicle responsive to said image signal;

establishing a reference position of said lane;

determining steering speed of the steering wheel;

detecting a distance of said vehicle from said reference position;

detecting a departing speed from said reference position;

detecting a returning speed to said reference position; and controlling a steering reaction force of said power steering mechanism based on said steering speed of said steering wheel when said vehicle is away from said reference position by more than a specified distance.

11. A lane moving-out prevention system of a vehicle having a power steering mechanism with a steering wheel and a power assist apparatus mounted on said vehicle and mechanically and hydraulically connected between said steering wheel and a vehicle wheel for assisting a driver to steer via a steering column, a steering angle sensor mounted on said steering column for detecting steering angle and for generating a steering angle signal, and a vehicle speed sensor mounted on said vehicle for detecting vehicle speed and for producing a vehicle speed signal, the system further comprising:

stereoscopic cameras for taking an image of objects outside said vehicle and for outputting an image signal of said objects;

monitoring means responsive to said image signal for recognizing a positional relationship between a lane to be traced and said vehicle and for producing a distance signal;

first computing means responsive to said distance signal, vehicle speed and said steering angle signal for establishing a reference position of said lane and a road condition and for generating a recognition signal; and second computing means responsive to said recognition signal, said steering angle signal and said vehicle speed signal for controlling a steering reaction force of said power steering mechanism as a function of steering speed thereof when a present position of said vehicle deviates from said reference position by more than a predetermined position so as to improve responsiveness of steering operations in accordance with said steering speed even when said steering wheel is suddenly turned and to effectively avoid dangerous situations even when said vehicle moves unintentionally out of said lane.

12. The system of claim 11, wherein the steering speed is determined by differentiating the steering angle represented by the steering angle signal from the steering angle sensor.

13. The system of claim 12, wherein the differentiating is provided by digital filtering.

14. The system of claim 12, wherein the differentiating is provided by a CR circuit through which the steering angle signal is passed.

15. The system of claim 12, wherein the steering reaction force is obtained from a correction reaction force provided by a map of gain vs. steering speed.

16. The system of claim 15, wherein the gain is a constant when said steering speed is greater than a predetermined value.

17. The system of claim 15, wherein the gain is a linear function of said steering speed when said steering speed is less than said predetermined value.

18. The system of claim 15, wherein the gain has a dead zone at a low range of said steering speed representing a normal turn of the vehicle.

19. The system of claim 15, wherein the steering reaction force is further obtained by a correction reaction force provided by a map of another gain vs. a speed represented by differentiating distance between the vehicle and the reference position.

20. The system of claim 15, wherein the steering reaction force is further obtained by a correction reaction force provided by a map of another gain vs. distance of the vehicle with respect to the reference position.

* * * * *